United States Patent
Li et al.

(10) Patent No.: US 11,934,037 B2
(45) Date of Patent: Mar. 19, 2024

(54) CAMERA LENS GROUP

(71) Applicant: ZHEJIANG SUNNY OPTICS CO., LTD., Yuyao Zhejiang (CN)

(72) Inventors: Long Li, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 531 days.

(21) Appl. No.: 17/192,240

(22) Filed: Mar. 4, 2021

(65) Prior Publication Data

US 2021/0333517 A1 Oct. 28, 2021

(30) Foreign Application Priority Data

Apr. 27, 2020 (CN) .......................... 202010343325.5

(51) Int. Cl.
*G02B 9/60* (2006.01)
*G02B 13/00* (2006.01)
*G02B 13/06* (2006.01)

(52) U.S. Cl.
CPC ............ *G02B 9/60* (2013.01); *G02B 13/0045* (2013.01); *G02B 13/0065* (2013.01); *G02B 13/06* (2013.01)

(58) Field of Classification Search
CPC .. G02B 9/60; G02B 13/0045; G02B 13/0065; G02B 13/06
See application file for complete search history.

(56) References Cited

U.S. PATENT DOCUMENTS

| 7,646,418 | B2 * | 1/2010 | Nanjo ............ G02B 15/145115 |
| | | | 348/335 |
| 2006/0017834 | A1 * | 1/2006 | Konno ............... G02B 13/0065 |
| | | | 348/335 |
| 2010/0045849 | A1 | 2/2010 | Yamasaki |
| 2019/0273848 | A1 * | 9/2019 | Satoh ..................... G03B 17/17 |

FOREIGN PATENT DOCUMENTS

| CN | 106324811 A | 1/2017 |
| JP | 2010049209 A | 3/2010 |

OTHER PUBLICATIONS

First Examination Report dated Jan. 28, 2022, in connection with India Patent Application No. 202114009343.

\* cited by examiner

*Primary Examiner* — George G. King
(74) *Attorney, Agent, or Firm* — Norris McLaughlin, P.A.

(57) ABSTRACT

The present disclosure discloses a camera lens group including, sequentially from an object side to an image side along an optical axis, a first lens having refractive power; a first prism having a first reflecting surface, and an angle between the first reflecting surface and the optical axis being 45°; a stop; a second lens having refractive power; a third lens having refractive power; a fourth lens having refractive power; a second prism having a second reflecting surface, and an angle between the second reflecting surface and the optical axis being 45°; and a fifth lens having refractive power. A maximum field-of-view FOV of the camera lens group satisfies: FOV≥80.0°.

20 Claims, 9 Drawing Sheets

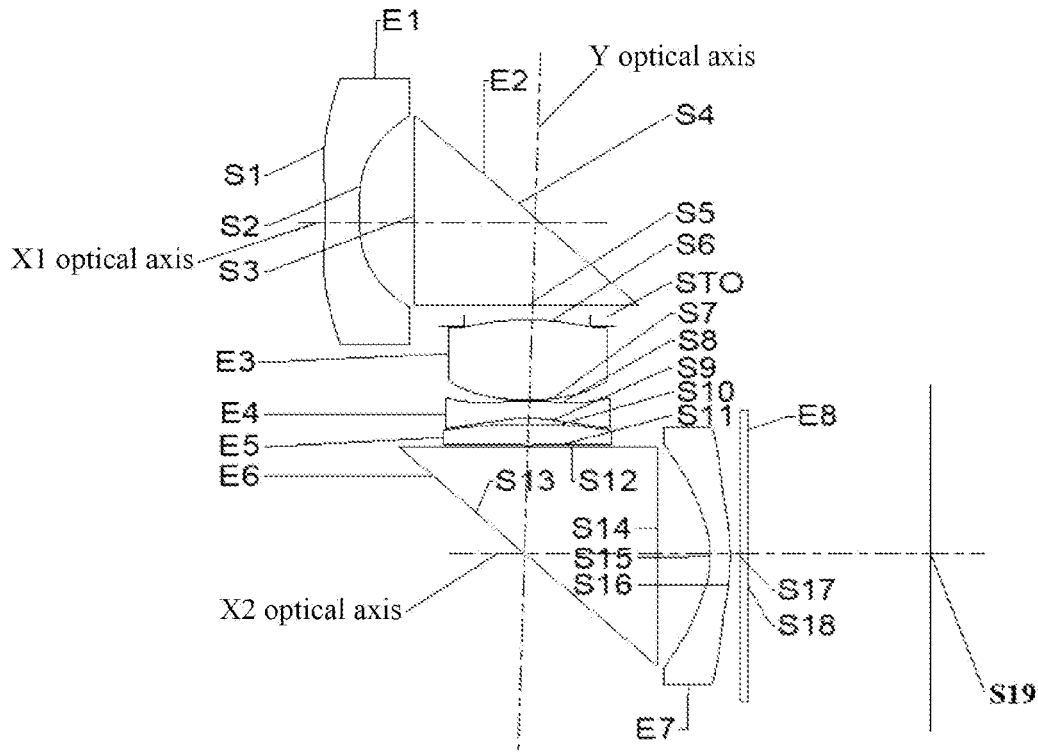
Fig. 1
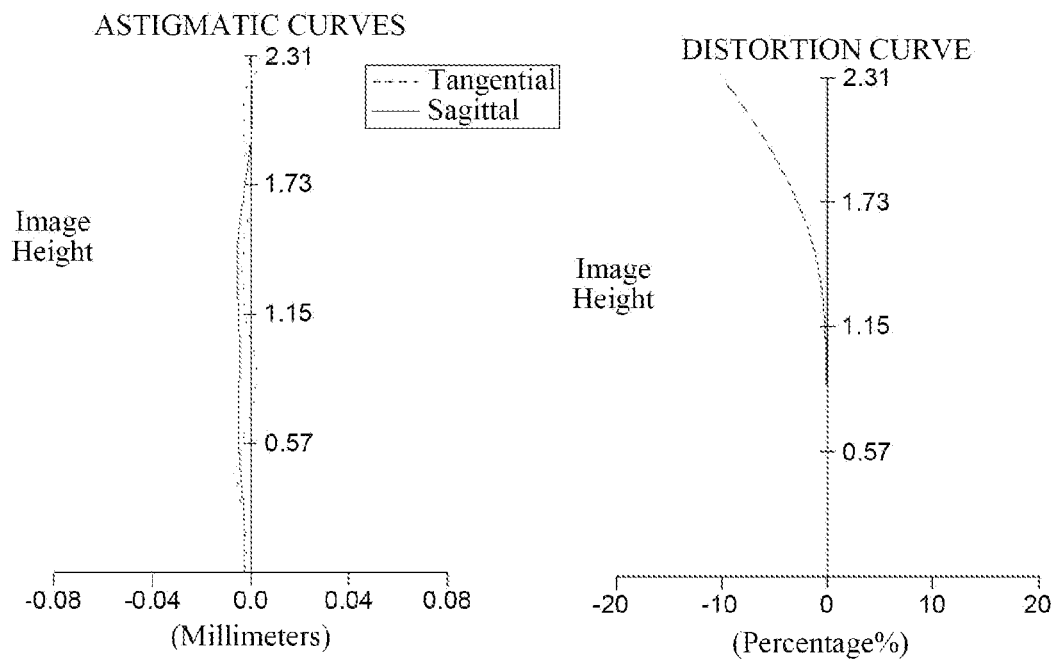
Fig. 2A                    Fig. 2B

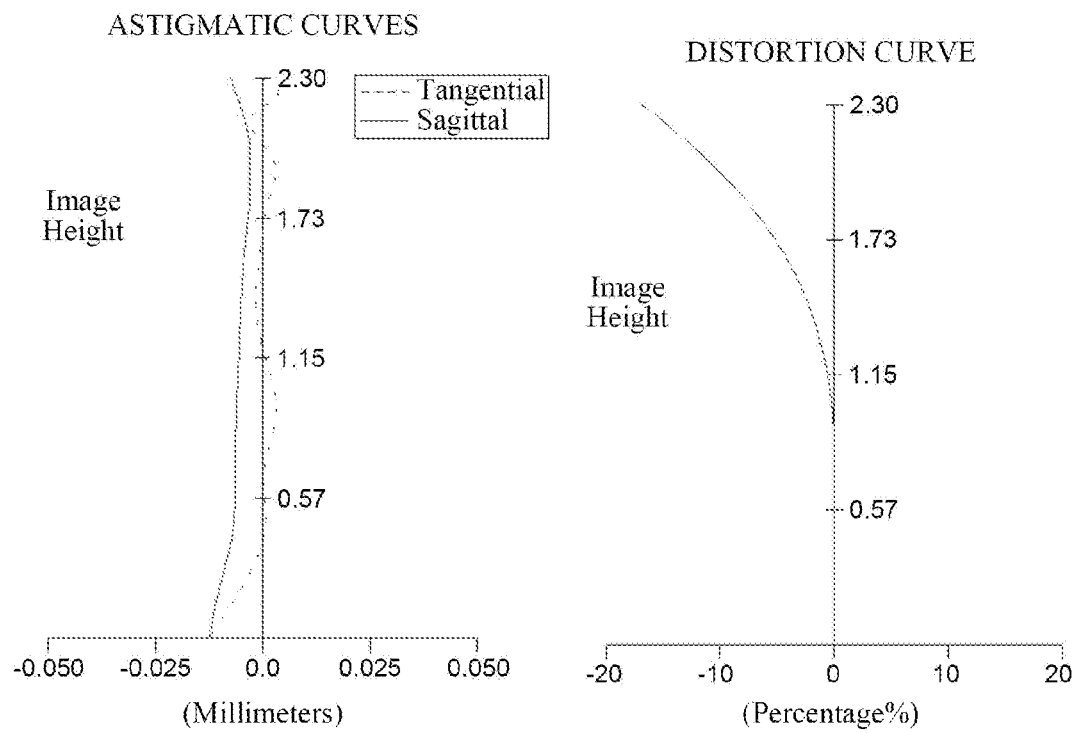
Fig. 8A
Fig. 8B
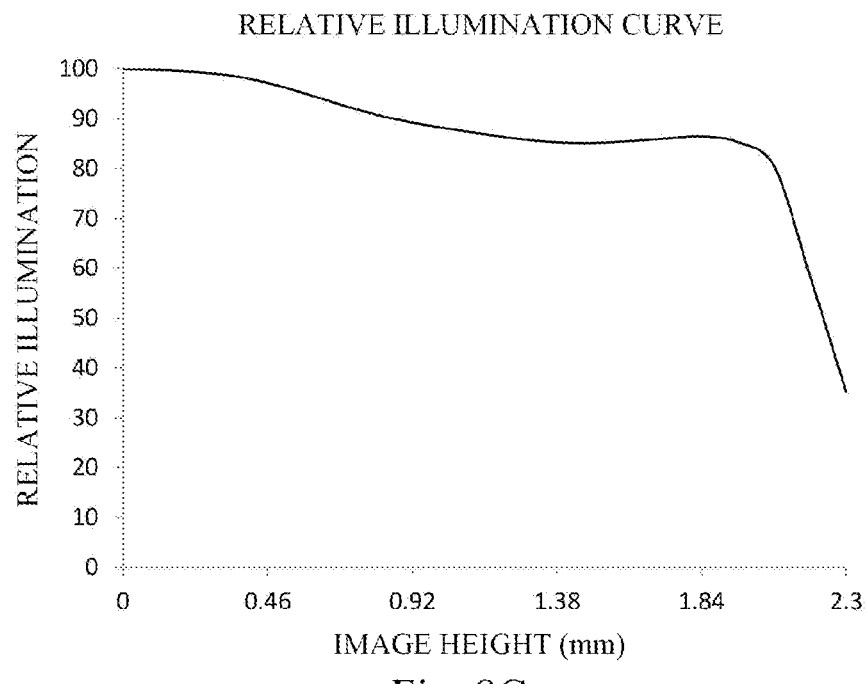
Fig. 8C

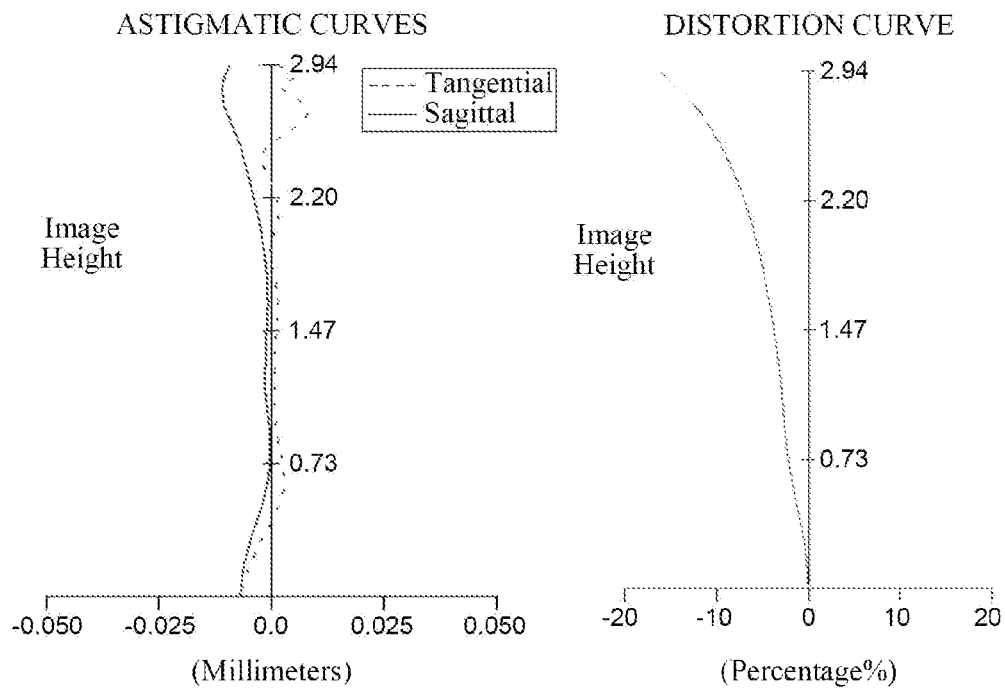
Fig. 12A
Fig. 12B
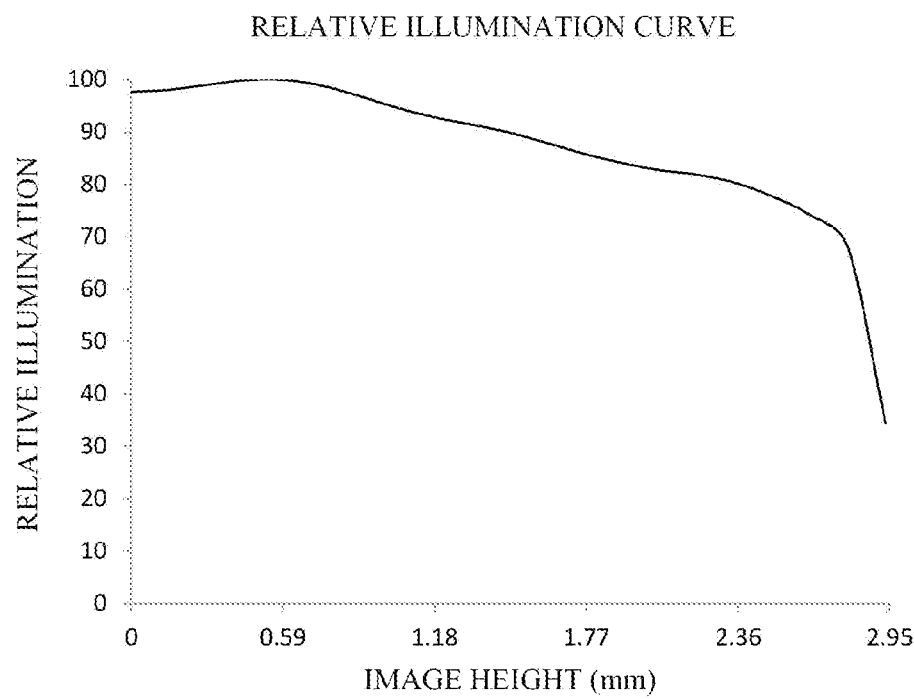
Fig. 12C ures of the portable electronic products, such as ultra-thin, miniaturization, and wide-angle, is one of the problems that many lens designers need to solve urgently.

CAMERA LENS GROUP

CROSS-REFERENCE TO RELATED APPLICATION

This application claims benefit of priority to Chinese Patent Application No. 202010343325.5 filed on Apr. 27, 2020 before the China National Intellectual Property Administration, the entire disclosure of which is incorporated herein by reference in its entity.

TECHNICAL FIELD

The present disclosure relates to the field of optical elements, and more specifically, relates to a camera lens group.

BACKGROUND

At present, with the rapid development of the portable electronic products, such as smart phones, the application of camera lens assemblies is becoming more and more extensive. Most portable electronic products, such as smart phones, use a "3+1 combination" camera lens group including a large imaging plane lens assembly, a wide-angle lens assembly, a telephoto lens assembly and a TOF lens assembly. Particularly, the telephoto lens assembly usually has 5×, 10×, and 15× optical zoom capabilities. However, if a conventional coaxial design is used, the focal length of the telephoto lens assembly will be greatly limited by the overall length of the camera lens group. If a long focal length lens assembly that meets the requirements is to be achieved, it will inevitably make the portable electronic products, such as smart phones, unable to achieve ultra-thin characteristics.

How to ensure that the camera lens assembly has the characteristics of telephoto and good image quality while ensuring that the camera lens assembly has characteristics, such as ultra-thin, miniaturization, and wide-angle, is one of the problems that many lens designers need to solve urgently.

SUMMARY

In one aspect, the present disclosure provides a camera lens group which includes, sequentially from an object side to an image side along an optical axis, a first lens having refractive power; a first prism having a first reflecting surface, and an angle between the first reflecting surface and the optical axis being 45°; a stop; a second lens having refractive power; a third lens having refractive power; a fourth lens having refractive power; a second prism having a second reflecting surface, and an angle between the second reflecting surface and the optical axis being 45°; and a fifth lens having refractive power. A maximum field-of-view FOV of the camera lens group may satisfy: FOV≥80.0°.

In one embodiment, at least one of an object-side surface of the first lens to an image-side surface of the fifth lens is aspheric.

In one embodiment, half of a maximum field-of-view Semi-FOV of the camera lens group and half of a diagonal length ImgH of an effective pixel area on an imaging plane of the camera lens group may satisfy: 2.00 mm<ImgH/tan$^2$(Semi-FOV)<4.00 mm.

In one embodiment, an effective focal length f2 of the second lens and an effective focal length f4 of the fourth lens may satisfy: 2.00<f4/f2<5.00.

In one embodiment, a combined focal length f34 of the third lens and the fourth lens and a distance BFL from the fifth lens to an imaging plane of the camera lens group along the optical axis may satisfy: 30.00<f34/BFL<40.00.

In one embodiment, a radius of curvature R1 of an object-side surface of the first lens and a radius of curvature R4 of an image-side surface of the second lens may satisfy: 2.00<(R1+R4)/(R1−R4)<3.00.

In one embodiment, a radius of curvature R3 of an object-side surface of the second lens and a radius of curvature R6 of an image-side surface of the third lens may satisfy: 0.50<R6/R3<2.50.

In one embodiment, a radius of curvature R2 of an image-side surface of the first lens and a total effective focal length f of the camera lens group may satisfy: 1.00<R2/f<5.00.

In one embodiment, a combined focal length f23 of the second lens and the third lens and a combined focal length f234 of the second lens, the third lens and the fourth lens may satisfy: 5.00<(f23+f234)/(f23−f234)<11.00.

In one embodiment, a center thickness CT2 of the second lens along the optical axis and a center thickness CT3 of the third lens along the optical axis may satisfy: 4.00<CT2/CT3<10.00.

In one embodiment, SAG11, being a distance along the optical axis from an intersection of an object-side surface of the first lens and the optical axis to a vertex of an effective radius of the object-side surface of the first lens, and SAG12, being a distance along the optical axis from an intersection of an image-side surface of the first lens and the optical axis to a vertex of an effective radius of the image-side surface of the first lens, may satisfy: 2.00<SAG12/SAG11<4.00.

In one embodiment, a maximum effective radius DT11 of an object-side surface of the first lens and a maximum effective radius DT12 of an image-side surface of the first lens may satisfy: 6.00<(DT11+DT12)/(DT11−DT12)<10.00.

In another aspect, the present disclosure provides a camera lens group which includes, sequentially from an object side to an image side along an optical axis, a first lens having refractive power; a first prism having a first reflecting surface, and an angle between the first reflecting surface and the optical axis being 45°; a stop; a second lens having refractive power; a third lens having refractive power; a fourth lens having refractive power; a second prism having a second reflecting surface, and an angle between the second reflecting surface and the optical axis being 45°; and a fifth lens having refractive power. Half of a maximum field-of-view Semi-FOV of the camera lens group and half of a diagonal length ImgH of an effective pixel area on an imaging plane of the camera lens group may satisfy: 2.00 mm<ImgH/tan$^2$(Semi-FOV)<4.00 mm.

The present disclosure provides a camera lens group, which has at least one beneficial effect, such as miniaturization, large field-of-view, and good image quality.

BRIEF DESCRIPTION OF THE DRAWINGS

Other features, objects, and advantages of the present disclosure will become more apparent by reading the detailed description of the non-limiting embodiments with reference to the accompanying drawings:

FIG. 1 illustrates a schematic structural view of a camera lens group according to example 1 of the present disclosure;

FIGS. 2A to 2C illustrate astigmatic curves, a distortion curve and a relative illumination curve of the camera lens group of the example 1, respectively;

FIGS. 8A to 8C illustrate astigmatic curves, a distortion curve and a relative illumination curve of the camera lens group of the example 4, respectively;

FIGS. 12A to 12C illustrate astigmatic curves, a distortion curve and a relative illumination curve of the camera lens group of the example 6, respectively.

DETAILED DESCRIPTION OF EMBODIMENTS

Figure 2C:
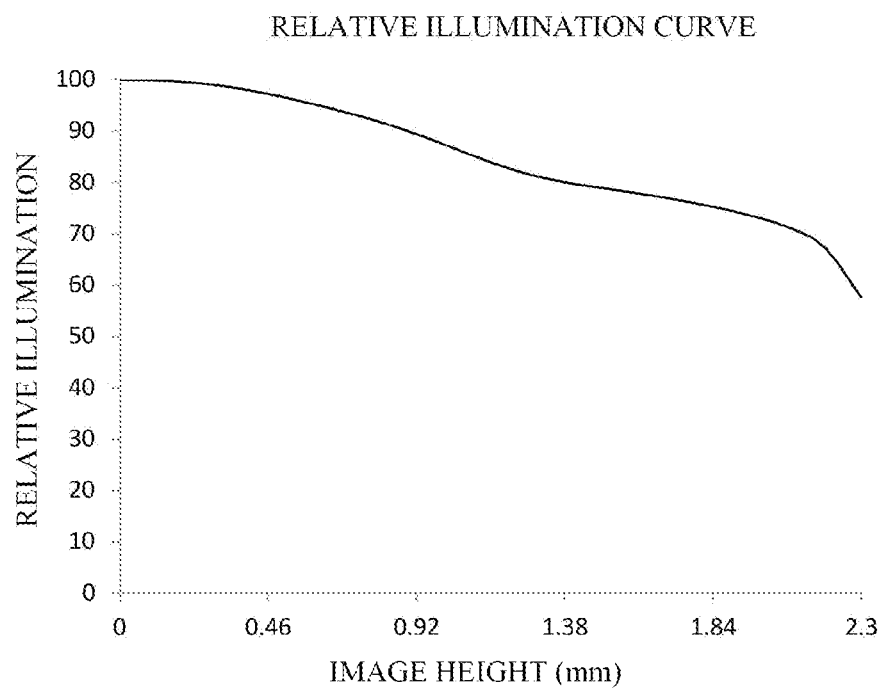

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens, and a first prism may also be referred to as a second prism without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include two prisms and five lenses having refractive power, which are a first lens, a first prism, a second lens, a third lens, a fourth lens, a second prism and a fifth lens. The two prisms and five lenses are arranged sequentially from an object side to an image side along an optical axis. The first lens and the first prism are arranged sequentially along an X1 optical axis. The second lens, the third lens and the fourth lens are arranged sequentially along a Y optical axis. The second prism and the fifth lens are arranged sequentially along an X2 optical axis. There may be a spaced interval between the first lens and the first prism arranged along the X1 optical axis. There may be a spaced interval between each two adjacent elements among the first prism to the second prism arranged along the Y optical axis. There may be a spaced interval between the second prism and the fifth lens arranged along the X2 optical axis.

In an exemplary embodiment, the first lens may have positive or negative refractive power. The first prism may have a light incident surface, a first reflecting surface, and a light emitting surface. The light emitted from an image-side surface of the first lens may be incident from the light incident surface of the first prism, reflected by the first reflecting surface, and emitted from the light exit surface of the first prism to an object-side surface of the second lens. The second lens may have positive or negative refractive power. The third lens may have positive or negative refractive power. The fourth lens may have positive or negative refractive power. The second prism may have a light incident surface, a second reflecting surface, and a light exit surface. The light emitted from an image-side surface of the fourth lens may be incident onto the light incident surface of the second prism, reflected by the second reflecting surface, and emitted from the light exit surface of the second prism. The fifth lens may have positive or negative refractive power.

The first prism arranged between the first lens and the second lens may be beneficial to increasing the FOV of the system, thereby expanding the using scope of the lens assembly. The second prism arranged between the fourth lens and the fifth lens may ensure that the imaging direction and the incident direction of the light are the same.

In an exemplary embodiment, the angle between the X1 optical axis and the Y optical axis may be 90°, and the angle between the Y optical axis and the X2 optical axis may be 90°. The angle between the first reflecting surface and the X1 optical axis may be 45°, and the angle between the second reflecting surface and the X2 optical axis may be 45°.

In an exemplary embodiment, the camera lens group according to the present disclosure may satisfy: FOV≥80.0°, where FOV is a maximum field-of-view of the camera lens group. Satisfying FOV≥80.0° may enable camera lens group applicable to be configured on more types of mobile phones, and greatly broaden the use range of the camera lens group with prism.

In an exemplary embodiment, the camera lens group according to the present disclosure may satisfy: 2.00 mm<ImgH/tan$^2$(Semi-FOV)<4.00 mm, where Semi-FOV is half of a maximum field-of-view of the camera lens group, and ImgH is half of a diagonal length of an effective pixel area on an imaging plane of the camera lens group. More specifically, ImgH and Semi-FOV may further satisfy: 2.50 mm<ImgH/tan$^2$(Semi-FOV)<4.00 mm. Satisfying 2.00 mm<ImgH/tan$^2$(Semi-FOV)<4.00 mm may make the camera lens group applicable to different environments.

In an exemplary embodiment, the camera lens group according to the present disclosure may satisfy: 2.00<f4/f2<5.00, where f2 is an effective focal length of the second lens, and f4 is an effective focal length of the fourth lens. More specifically, f4 and f2 may further satisfy: 2.60<f4/f2<4.70. Satisfying 2.00<f4/f2<5.00 is beneficial for the system to have a large FOV while ensuring a better light convergence ability, which is beneficial to improve the image quality.

In an exemplary embodiment, the camera lens group according to the present disclosure may satisfy: 30.00<f34/BFL<40.00, where f34 is a combined focal length of the third lens and the fourth lens, and BFL is a distance from the fifth lens to an imaging plane of the camera lens group along an X2 optical axis. More specifically, f34 and BFL may further satisfy: 30.20<f34/BFL<38.00. Satisfying 30.00<f34/BFL<40.00 may not only avoid the problem that the back focus is too short while improving the image quality through the third lens and the fourth lens, which is not beneficial to the later processing of the lens barrel, but also avoid the overall lateral distance of the system being too long due to the long back focus.

In an exemplary embodiment, the camera lens group according to the present disclosure may satisfy: 2.00<(R1+R4)/(R1−R4)<3.00, where R1 is a radius of curvature of an object-side surface of the first lens, and R4 is a radius of curvature of an image-side surface of the second lens. More specifically, R1 and R4 may further satisfy: 2.50<(R1+R4)/(R1−R4)<2.90. When 2.00<(R1+R4)/(R1−R4)<3.00 is satisfied, it may be beneficial to increase the FOV of the system to ensure the image quality, and reduce the sensitivity of the lens so as to let the lens has a better manufacturability.

In an exemplary embodiment, the camera lens group according to the present disclosure may satisfy: 0.50<R6/R3<2.50, where R3 is a radius of curvature of an object-side surface of the second lens, and R6 is a radius of curvature of an image-side surface of the third lens. More specifically, R6 and R3 may further satisfy: 0.70<R6/R3<2.30. Satisfying 0.50<R6/R3<2.50 is beneficial to improve the aberration correction ability of the system. Meanwhile, the sensitivity of the second lens and the third lens may be appropriately controlled to ensure a better manufacturability.

In an exemplary embodiment, the camera lens group according to the present disclosure may satisfy: 1.00<R2/f<5.00, where R2 is a radius of curvature of an image-side surface of the first lens, and f is a total effective focal length of the camera lens group. More specifically, R2 and f may further satisfy: 1.60<R2/f<4.60. When 1.00<R2/f<5.00 is satisfied, the refractive power of the system may be assigned more reasonably to avoid excessive concentration of the refractive power on the first lens, thereby reducing the sensitivity of the first lens.

In an exemplary embodiment, the camera lens group according to the present disclosure may satisfy: 5.00<(f23+f234)/(f23−f234)<11.00, where f23 is a combined focal length of the second lens and the third lens, and f234 is a combined focal length of the second lens, the third lens and the fourth lens. More specifically, f23 and f234 may further satisfy: 5.80<(f23+f234)/(f23−f234)<11.00. Satisfying 5.00<(f23+f234)/(f23−f234)<11.00 is conducive to a more reasonable distribution of the refractive power of the system, which has a more obvious effect on reducing the sensitivity and improving the processing of the lens.

In an exemplary embodiment, the camera lens group according to the present disclosure may satisfy: 4.00<CT2/CT3<10.00, where CT2 is a center thickness of the second lens along the optical axis, and CT3 is a center thickness of the third lens along the optical axis. More specifically, CT2 and CT3 may further satisfy: 4.60<CT2/CT3<9.40. Satisfying 4.00<CT2/CT3<10.00 is beneficial to reduce the aberration of the system while avoiding the size of the system from being too large. At the same time, it is also beneficial to correct the distortion of the system.

In an exemplary embodiment, the camera lens group according to the present disclosure may satisfy: 2.00<SAG12/SAG11<4.00, where SAG11 is a distance along the optical axis from an intersection of an object-side surface of the first lens and the optical axis to a vertex of an effective radius of the object-side surface of the first lens, and SAG12 is a distance along the optical axis from an intersection of an image-side surface of the first lens and the optical axis to a vertex of an effective radius of the image-side surface of the first lens. More specifically, SAG12 and SAG11 may further satisfy: 2.50<SAG12/SAG11<3.80. When 2.00<SAG12/SAG11<4.00 is satisfied, it may ensure that the FOV of the system is expended while avoiding the first lens being too sensitive and avoiding the risk of ghosting caused by the first lens.

In an exemplary embodiment, the camera lens group according to the present disclosure may satisfy: 6.00<(DT11+DT12)/(DT11−DT12)<10.00, where DT11 is a maximum effective radius of an object-side surface of the first lens, and DT12 is a maximum effective radius of an image-side surface of the first lens. More specifically, DT11 and DT12 may further satisfy: 6.00<(DT11+DT12)/(DT11−DT12)<9.60. When 6.00<(DT11+DT12)/(DT11−DT12)<10.00 is satisfied, it may ensure that the FOV of the system is expended while avoiding problems, such as increased sensitivity of the first lens and processing difficulties. Also, it is also beneficial to reduce the size of the first lens.

In an exemplary embodiment, the camera lens group according to the present disclosure further includes a stop disposed between the first prism and the second lens. Optionally, the above camera lens group may further include an optical filter for correcting the color deviation and/or a protective glass for protecting the photosensitive element located on an imaging plane. The present disclosure proposes a camera lens group with the features, such as miniaturization, large field-of-view, and ultra-thinness. The camera lens group according to the above embodiments of the present disclosure may employ a plurality of lenses, such as five lenses and two prisms as described above. By properly configuring the refractive power of each lens, the surface shape, the center thickness of each lens, and spaced intervals along the optical axis between the lenses, the position of the reflecting surface and the spaced interval between the prism and the lens, the incident light may be effectively converged, the total length of the camera lens group may be reduced, and the workability of the camera lens group may be improved, such that the camera lens group is more advantageous for production processing.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking five lenses as an example, the camera lens group is not limited to include five lenses. The camera lens group may also include other numbers of lenses if desired.

Some specific examples of a camera lens group applicable to the above embodiment will be further described below with reference to the accompanying drawings.

EXAMPLE 1

A camera lens group according to example 1 of the present disclosure is described below with reference to FIG. 1 to FIG. 2C. FIG. 1 shows a schematic structural view of the camera lens group according to example 1 of the present disclosure.

As shown in FIG. 1, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E1 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is convex, and an image-side surface S11 thereof is convex. The second prism E6 has a light incident surface S12, a second reflecting surface S13, and a light exit surface S14. The fifth lens E7 has negative refractive power, an object-side surface S15 thereof is concave, and an image-side surface S16 thereof is convex. The optical filter E8 has an object-side surface S17 and an image-side surface S18. Light from an object sequentially passes through the respective surfaces S1 to S18 and is finally imaged on the imaging plane S19.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.0016 | 0.4129 | 1.55 | 56.1 | −4.36 | 4.8826 |
| S2 | Aspheric | 4.6712 | 0.6882 | | | | −2.0867 |
| S3 | Spherical | Infinite | 1.4000 | 1.52 | 64.2 | | |
| S4 | Spherical | Infinite | −1.4000 | 1.52 | 64.2 | | |
| S5 | Spherical | Infinite | −0.2713 | | | | |
| STO | Spherical | Infinite | −0.0947 | | | | |
| S6 | Aspheric | 2.5807 | 1.1774 | 1.55 | 56.1 | 2.42 | 1.5400 |
| S7 | Aspheric | −2.2719 | 0.0164 | | | | 0.9191 |
| S8 | Aspheric | 4.7886 | 0.2500 | 1.67 | 20.4 | −4.79 | −85.1378 |
| S9 | Aspheric | 1.8765 | 0.0829 | | | | −6.4954 |
| S10 | Aspheric | 8.0750 | 0.3067 | 1.55 | 56.1 | 6.51 | −46.3104 |
| S11 | Aspheric | −6.2662 | 0.0200 | | | | −1.1676 |
| S12 | Spherical | Infinite | −1.6000 | 1.52 | 64.2 | | |
| S13 | Spherical | Infinite | 1.6000 | 1.52 | 64.2 | | |
| S14 | Spherical | Infinite | 0.6577 | | | | |
| S15 | Aspheric | −1.8027 | 0.2500 | 1.67 | 20.4 | −6.21 | −3.7318 |
| S16 | Aspheric | −3.3662 | 0.1130 | | | | −52.4114 |
| S17 | Spherical | Infinite | 0.1100 | 1.52 | 64.2 | | |

TABLE 1-continued

| Surface number | Surface type | Radius of curvature | Thickness/ Distance | Material Refractive index | Abbe number | Focal length | Conic coefficient |
|---|---|---|---|---|---|---|---|
| S18 | Spherical | Infinite | 0.2839 | | | | |
| S19 | Spherical | Infinite | | | | | |

In this example, half of a diagonal length ImgH of an effective pixel area on the imaging plane S19 of the camera lens group is 2.30 mm, half of a maximum field-of-view Semi-FOV of the camera lens group is 43.0°, an aperture value Fno of the camera lens group is 3.00, and a total effective focal length f of the camera lens group is 2.74 mm.

In example 1, the object-side surface and the image-side surface of any one of the first lens E1 to the fifth lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S2, S6 to S11, and S15 to S16 in example 1.

TABLE 2

| Surface number | A4 | A6 | A8 | A10 | A12 |
|---|---|---|---|---|---|
| S1 | 1.4689E−01 | −4.3885E−02 | −6.4457E−02 | 1.2838E−01 | −1.1797E−01 |
| S2 | 1.6417E−01 | −5.5602E−03 | 4.9206E−02 | −6.8228E−01 | 1.9404E+00 |
| S6 | 3.1152E−02 | −3.1187E−01 | 6.2339E+00 | −6.8716E+01 | 4.8395E+02 |
| S7 | −1.9198E−02 | 4.7759E−01 | −5.1289E+00 | 3.3349E+01 | −1.3393E+02 |
| S8 | 6.2582E−02 | 6.7738E−01 | −5.4116E+00 | 2.4885E+01 | −7.2257E+01 |
| S9 | −2.3268E−02 | 1.1084E+00 | −5.1677E+00 | 1.3610E+01 | −2.3057E+01 |
| S10 | −2.2444E−01 | 1.2173E+00 | −4.5305E+00 | 1.5541E+01 | −5.5865E+01 |
| S11 | −1.1674E−01 | 1.9853E−01 | −1.0456E+00 | 5.7616E+00 | −2.3306E+01 |
| S15 | −1.0026E−01 | 4.8637E−01 | −1.3350E+00 | 2.4407E+00 | −2.9951E+00 |
| S16 | −1.9641E−01 | 7.3050E−01 | −1.6195E+00 | 2.4785E+00 | −2.6121E+00 |

| Surface number | A14 | A16 | A18 | A20 |
|---|---|---|---|---|
| S1 | 6.7862E−02 | −2.5811E−02 | 6.4814E−03 | −1.0320E−03 |
| S2 | −2.9080E+00 | 2.6761E+00 | −1.5643E+00 | 5.6769E−01 |
| S6 | −2.2680E+03 | 7.2306E+03 | −1.5739E+04 | 2.3014E+04 |
| S7 | 3.6379E+02 | −6.9249E+02 | 9.2546E+02 | −8.4923E+02 |
| S8 | 1.4316E+02 | −1.9979E+02 | 1.9355E+02 | −1.2271E+02 |
| S9 | 2.9055E+01 | −3.3950E+01 | 3.7353E+01 | −3.0020E+01 |
| S10 | 1.6812E+02 | −3.5989E+02 | 5.2229E+02 | −5.0180E+02 |
| S11 | 6.4185E+01 | −1.2240E+02 | 1.6338E+02 | −1.4975E+02 |
| S15 | 2.4660E+00 | −1.3649E+00 | 5.0242E−01 | −1.1860E−01 |
| S16 | 1.9035E+00 | −9.6651E−01 | 3.4149E−01 | −8.2423E−02 |

FIG. 2A illustrates astigmatic curves of the camera lens group according to example 1, representing the curvatures of a tangential plane and the curvatures of a sagittal plane. FIG. 2B illustrates a distortion curve of the camera lens group according to example 1, representing the amounts of distortion corresponding to different image heights. FIG. 2C illustrates a relative illumination curve of the camera lens group according to example 1, representing the amounts of relative illuminations corresponding to different image heights. It can be seen from FIG. 2A to FIG. 2C that the camera lens group provided in example 1 may achieve good image quality.

EXAMPLE 2

Figure 3:
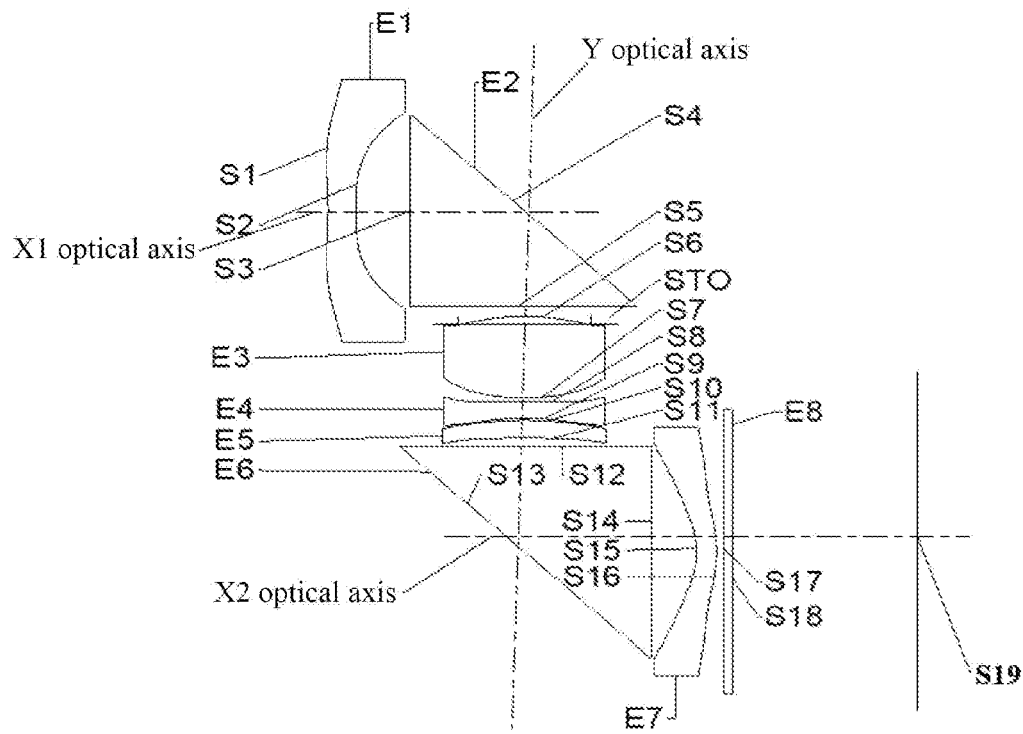
FIG. 3 illustrates a schematic structural view of a camera lens group according to example 2 of the present disclosure.

A camera lens group according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E10 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is convex, and an image-side surface S11 thereof is concave. The second prism E6 has a light incident surface S12, a second reflecting surface S13, and a light exit surface S14. The fifth lens E7 has negative refractive power, an object-side surface S15 thereof is concave, and an image-side surface S16 thereof is convex. The optical filter E8 has an object-side surface S17 and an image-side surface S18. Light from an object sequentially passes through the respective surfaces S1 to S18 and is finally imaged on the imaging plane S19.

In this example, half of a diagonal length ImgH of an effective pixel area on the imaging plane S19 of the camera lens group is 2.30 mm, half of a maximum field-of-view Semi-FOV of the camera lens group is 43.5°, an aperture value Fno of the camera lens group is 2.90, and a total effective focal length f of the camera lens group is 2.98 mm.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −5.0000 | 0.3418 | 1.55 | 56.1 | −5.10 | 4.8903 |
| S2 | Aspheric | 6.4364 | 0.6902 | | | | −6.0040 |
| S3 | Spherical | Infinite | 1.4300 | 1.52 | 64.2 | | |
| S4 | Spherical | Infinite | −1.4300 | 1.52 | 64.2 | | |
| S5 | Spherical | Infinite | −0.2713 | | | | |
| STO | Spherical | Infinite | −0.1280 | | | | |
| S6 | Aspheric | 2.4801 | 1.2174 | 1.55 | 56.1 | 2.43 | 1.7367 |
| S7 | Aspheric | −2.3665 | 0.0427 | | | | 0.8277 |
| S8 | Aspheric | 7.1665 | 0.2500 | 1.67 | 20.4 | −4.74 | −79.2154 |
| S9 | Aspheric | 2.1631 | 0.0349 | | | | −6.8353 |
| S10 | Aspheric | 3.8536 | 0.2682 | 1.55 | 56.1 | 7.11 | −39.5922 |
| S11 | Aspheric | 500.0000 | 0.0910 | | | | −99.0000 |
| S12 | Spherical | Infinite | −1.6000 | 1.52 | 64.2 | | |
| S13 | Spherical | Infinite | 1.6000 | 1.52 | 64.2 | | |
| S14 | Spherical | Infinite | 0.5659 | | | | |
| S15 | Aspheric | −1.2050 | 0.2500 | 1.67 | 20.4 | −5.99 | −5.9064 |
| S16 | Aspheric | −1.8689 | 0.0900 | | | | −30.7241 |
| S17 | Spherical | Infinite | 0.1100 | 1.52 | 64.2 | | |
| S18 | Spherical | Infinite | 0.2609 | | | | |
| S19 | Spherical | Infinite | | | | | |

TABLE 4

| Surface number | A4 | A6 | A8 | A10 | A12 |
|---|---|---|---|---|---|
| S1 | 1.6212E−01 | −1.2040E−01 | 1.0360E−01 | −8.7366E−02 | 6.1595E−02 |
| S2 | 1.8351E−01 | −1.1361E−01 | 1.3498E−01 | −1.8448E−01 | 2.1588E−01 |
| S6 | 2.6771E−02 | −1.5268E−01 | 2.8739E+00 | −2.8501E+01 | 1.8250E+02 |
| S7 | −2.1351E−02 | 1.8637E−01 | −7.5370E−02 | −5.5191E+00 | 4.7587E+01 |
| S8 | 7.7796E−02 | 4.5140E−01 | −3.8539E+00 | 1.7309E+01 | −4.3928E+01 |
| S9 | −8.0225E−02 | 2.1792E+00 | −1.3171E+01 | 4.6142E+01 | −1.0047E+02 |
| S10 | −3.2781E−01 | 2.5467E+00 | −1.1649E+01 | 2.9539E+01 | −2.6981E+01 |
| S11 | −1.1916E−01 | 1.9963E−01 | −4.4556E−01 | −3.5371E−02 | 4.5393E+00 |
| S15 | −6.8132E−02 | 1.7316E−01 | 2.3506E−02 | −7.6606E−01 | 1.6593E+00 |
| S16 | −2.3758E−01 | 8.9891E−01 | −1.6893E+00 | 2.1370E+00 | −1.9399E+00 |

| Surface number | A14 | A16 | A18 | A20 |
|---|---|---|---|---|
| S1 | −3.2980E−02 | 1.2755E−02 | −3.4205E−03 | 6.0084E−04 |
| S2 | −1.9227E−01 | 1.2661E−01 | −5.9802E−02 | 1.9054E−02 |
| S6 | −7.8287E+02 | 2.2976E+03 | −4.6265E+03 | 6.2857E+03 |
| S7 | −2.0042E+02 | 5.0919E+02 | −8.3196E+02 | 8.8299E+02 |
| S8 | 6.3682E+01 | −4.2129E+01 | −1.5028E+01 | 4.9834E+01 |
| S9 | 1.3388E+02 | −9.4267E+01 | 4.8572E+00 | 4.7514E+01 |
| S10 | −7.1696E+01 | 2.9949E+02 | −5.1902E+02 | 5.2598E+02 |
| S11 | −1.7911E+01 | 3.7473E+01 | −4.8006E+01 | 3.9600E+01 |
| S15 | −1.9836E+00 | 1.5344E+00 | −7.9664E−01 | 2.7587E−01 |
| S16 | 1.2774E+00 | −6.0867E−01 | 2.0741E−01 | −4.9252E−02 |

Figure 4A:
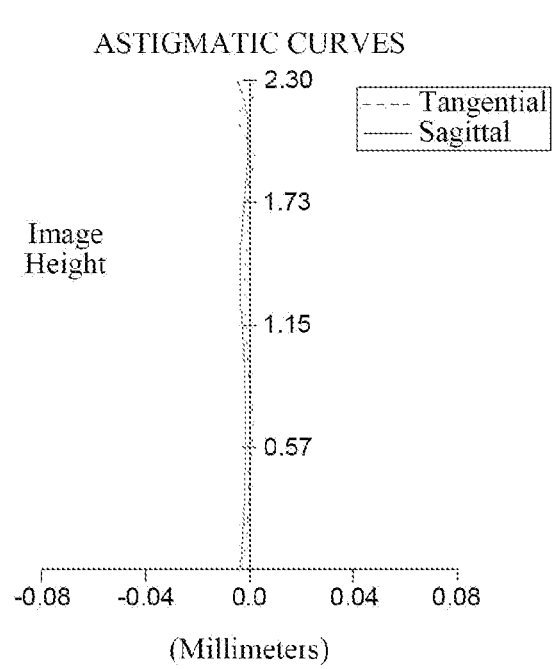
FIGS. 4A to 4C illustrate astigmatic curves, a distortion curve and a relative illumination curve of the camera lens group of the example 2, respectively.
Figure 4B:
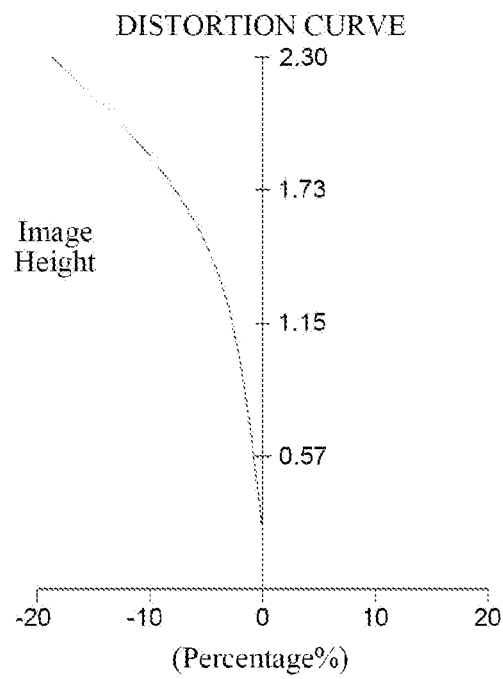
Figure 4C:
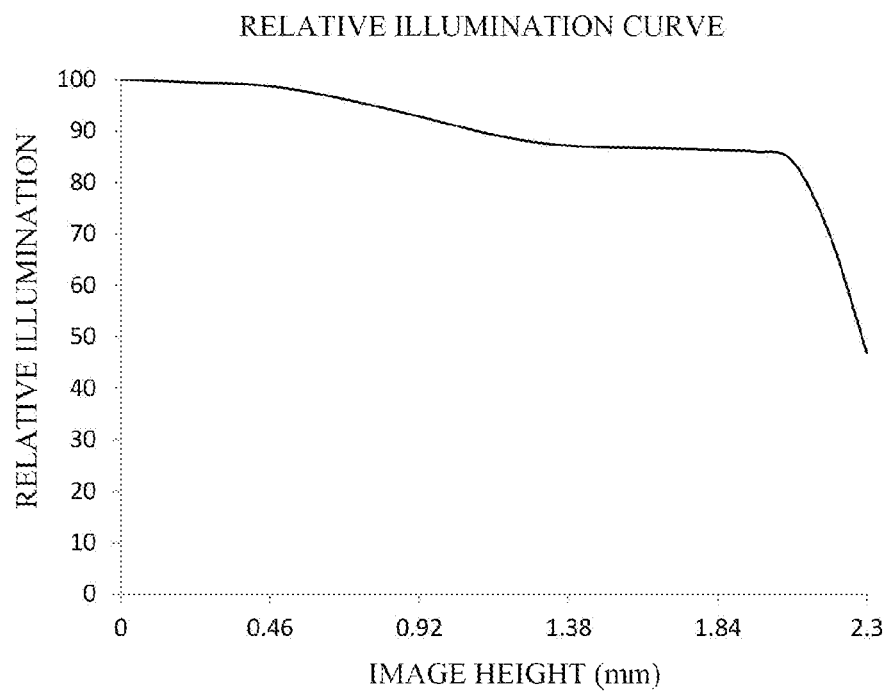

FIG. 4A illustrates the astigmatic curves of the camera lens group according to example 2, representing the curvatures of a tangential plane and the curvatures of a sagittal plane. FIG. 4B illustrates a distortion curve of the camera lens group according to example 2, representing the amounts of distortion corresponding to different image heights. FIG. 4C illustrates a relative illumination curve of the camera lens group according to example 2, representing the amounts of relative illuminations corresponding to different image heights. It can be seen from FIG. 4A to FIG. 4C that the camera lens group provided in example 2 may achieve good image quality.

EXAMPLE 3

Figure 5:
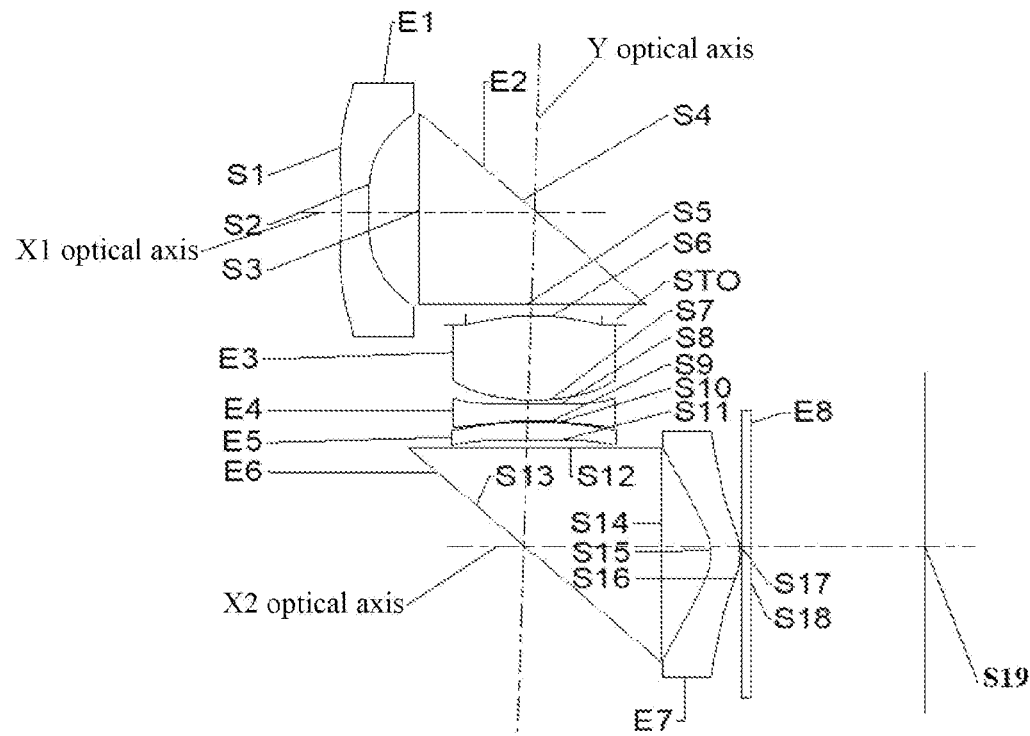
FIG. 5 illustrates a schematic structural view of a camera lens group according to example 3 of the present disclosure.

A camera lens group according to example 3 of the present disclosure is described below with reference to FIG. 5 to FIG. 6C. FIG. 5 shows a schematic structural view of the camera lens group according to example 3 of the present disclosure.

As shown in FIG. 5, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E1 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is convex, and an image-side surface S9 thereof is concave. The fourth lens E5 has positive refractive power, an object-side surface S10 thereof is convex, and an image-side surface S11 thereof is concave. The second prism E6 has a light incident surface S12, a second reflecting surface S13, and a light exit surface S14. The fifth lens E7 has positive refractive power, an object-side surface S15 thereof is concave, and an image-side surface S16 thereof is convex. The optical filter E8 has an object-side surface S17 and an image-side surface S18. Light from an object sequentially passes through the respective surfaces S1 to S18 and is finally imaged on the imaging plane S19.

In this example, half of a diagonal length ImgH of an effective pixel area on the imaging plane S19 of the camera lens group is 2.30 mm, half of a maximum field-of-view Semi-FOV of the camera lens group is 42.2°, an aperture value Fno of the camera lens group is 2.85, and a total effective focal length f of the camera lens group is 3.03 mm.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −4.9968 | 0.3288 | 1.55 | 56.1 | −5.25 | 4.8926 |
| S2 | Aspheric | 6.8663 | 0.6470 | | | | −5.9121 |
| S3 | Spherical | Infinite | 1.4300 | 1.52 | 64.2 | | |
| S4 | Spherical | Infinite | −1.4300 | 1.52 | 64.2 | | |
| S5 | Spherical | Infinite | −0.2713 | | | | |
| STO | Spherical | Infinite | −0.1338 | | | | |
| S6 | Aspheric | 2.4815 | 1.2504 | 1.55 | 56.1 | 2.43 | 1.8172 |
| S7 | Aspheric | −2.3519 | 0.0480 | | | | 0.7332 |
| S8 | Aspheric | 9.5605 | 0.2500 | 1.67 | 20.4 | −5.04 | −92.3212 |
| S9 | Aspheric | 2.4601 | 0.0262 | | | | −6.6543 |
| S10 | Aspheric | 4.2752 | 0.2625 | 1.55 | 56.1 | 7.93 | −38.9132 |
| S11 | Aspheric | 322.3498 | 0.0907 | | | | 99.0000 |
| S12 | Spherical | Infinite | −1.6000 | 1.52 | 64.2 | | |
| S13 | Spherical | Infinite | 1.6000 | 1.52 | 64.2 | | |
| S14 | Spherical | Infinite | 0.6210 | | | | |
| S15 | Aspheric | −0.8358 | 0.3641 | 1.67 | 20.4 | 17.04 | −4.5866 |
| S16 | Aspheric | −0.9143 | 0.0198 | | | | −8.4445 |
| S17 | Spherical | Infinite | 0.1100 | 1.52 | 64.2 | | |
| S18 | Spherical | Infinite | 0.2500 | | | | |
| S19 | Spherical | Infinite | | | | | |

TABLE 6

| Surface number | A4 | A6 | A8 | A10 | A12 |
|---|---|---|---|---|---|
| S1 | 1.5877E−01 | −1.1237E−01 | 9.0792E−02 | −7.1240E−02 | 4.6729E−02 |
| S2 | 2.0010E−01 | −2.6497E−01 | 7.7797E−01 | −1.8190E+00 | 2.9238E+00 |
| S6 | 4.8301E−02 | −8.2166E−01 | 1.2984E+01 | −1.1899E+02 | 7.0165E+02 |
| S7 | −9.0970E−03 | 5.1414E−02 | 9.2128E−01 | −1.0609E+01 | 6.4294E+01 |
| S8 | 1.1347E−01 | −9.5189E−02 | 1.0560E+00 | −1.0659E+01 | 6.2028E+01 |

TABLE 6-continued

| S9  | −1.1340E−01 | 2.4084E+00 | −1.3654E+01 | 4.3085E+01  | −7.4430E+01 |
| S10 | −3.5895E−01 | 2.8691E+00 | −1.2504E+01 | 2.4838E+01  | 1.8488E+01  |
| S11 | −1.3316E−01 | 4.8362E−01 | −3.1011E+00 | 1.5102E+01  | −5.1122E+01 |
| S15 | −7.8539E−02 | 1.2522E−01 | 7.6581E−01  | −3.3574E+00 | 6.4551E+00  |
| S16 | −3.7791E−01 | 1.8396E+00 | −3.9540E+00 | 5.3970E+00  | −5.1028E+00 |

| Surface number | A14 | A16 | A18 | A20 |
|---|---|---|---|---|
| S1  | −2.3662E−02 | 8.8918E−03  | −2.3842E−03 | 4.2896E−04  |
| S2  | −3.2117E+00 | 2.4064E+00  | −1.2076E+00 | 3.8764E−01  |
| S6  | −2.7791E+03 | 7.5523E+03  | −1.4119E+04 | 1.7853E+04  |
| S7  | −2.3358E+02 | 5.4079E+02  | −8.2065E+02 | 8.1488E+02  |
| S8  | −2.0820E+02 | 4.2924E+02  | −5.5575E+02 | 4.4128E+02  |
| S9  | 4.3766E+01  | 8.5366E+01  | −2.1469E+02 | 2.0975E+02  |
| S10 | −2.4544E+02 | 6.9471E+02  | −1.1021E+03 | 1.0909E+03  |
| S11 | 1.1656E+02  | −1.7525E+02 | 1.6614E+02  | −8.7388E+01 |
| S15 | −7.5479E+00 | 5.8405E+00  | −3.0619E+00 | 1.0778E+00  |
| S16 | 3.4396E+00  | −1.6649E+00 | 5.7438E−01  | −1.3784E−01 |

Figures 6A, 6B:
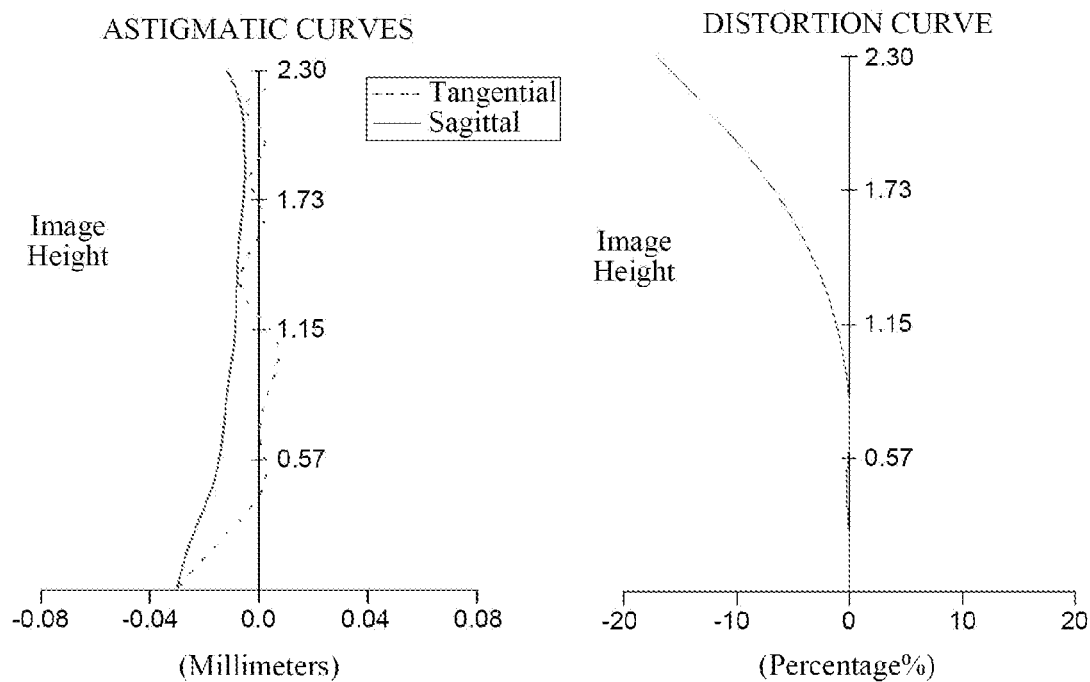
FIGS. 6A to 6C illustrate astigmatic curves, a distortion curve and a relative illumination curve of the camera lens group of the example 3, respectively.
Figure 6C:
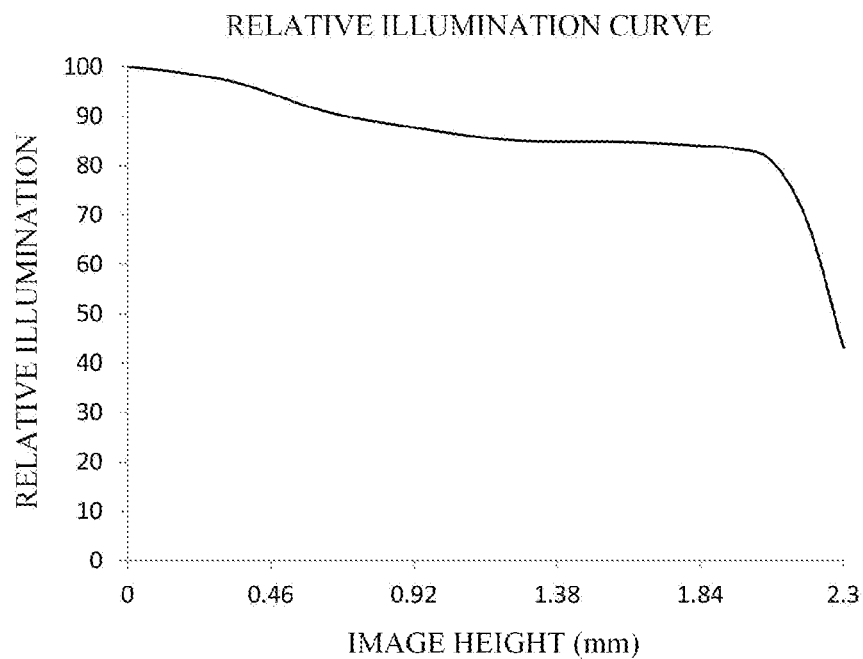

FIG. 6A illustrates the astigmatic curves of the camera lens group according to example 3, representing the curvatures of a tangential plane and the curvatures of a sagittal plane. FIG. 6B illustrates a distortion curve of the camera lens group according to example 3, representing the amounts of distortion corresponding to different image heights. FIG. 6C illustrates a relative illumination curve of the camera lens group according to example 3, representing the amounts of relative illuminations corresponding to different image heights. It can be seen from FIG. 6A to FIG. 6C that the camera lens group provided in example 3 may achieve good image quality.

EXAMPLE 4

Figure 7:
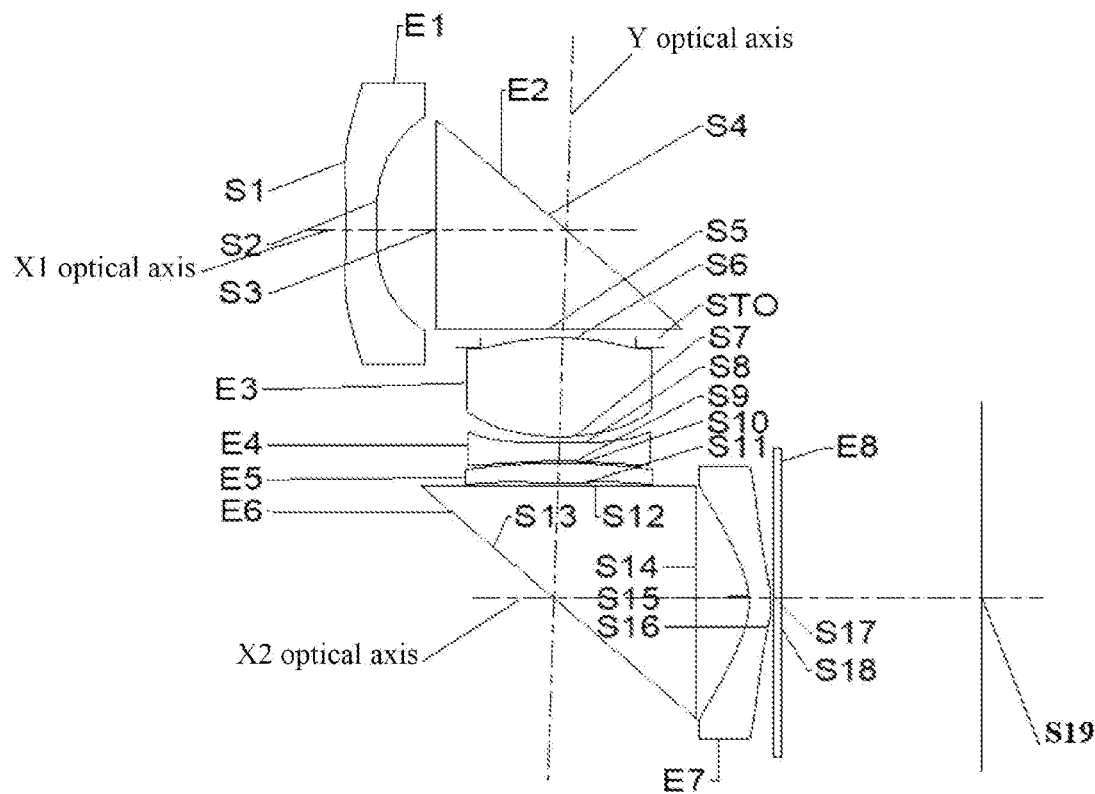
FIG. 7 illustrates a schematic structural view of a camera lens group according to example 4 of the present disclosure.

A camera lens group according to example 4 of the present disclosure is described below with reference to FIG. 7 to FIG. 8C. FIG. 7 shows a schematic structural view of the camera lens group according to example 4 of the present disclosure.

As shown in FIG. 7, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E1 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is concave, and an image-side surface S9 thereof is concave. The fourth lens E5 has positive refractive power, an object-side surface S10 thereof is convex, and an image-side surface S11 thereof is convex. The second prism E6 has a light incident surface S12, a second reflecting surface S13, and a light exit surface S14. The fifth lens E7 has negative refractive power, an object-side surface S15 thereof is concave, and an image-side surface S16 thereof is convex. The optical filter E8 has an object-side surface S17 and an image-side surface S18. Light from an object sequentially passes through the respective surfaces S1 to S18 and is finally imaged on the imaging plane S19.

In this example, half of a diagonal length ImgH of an effective pixel area on the imaging plane S19 of the camera lens group is 2.30 mm, half of a maximum field-of-view Semi-FOV of the camera lens group is 42.5°, an aperture value Fno of the camera lens group is 2.60, and a total effective focal length f of the camera lens group is 3.01 mm.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1  | Aspheric  | −5.0031  | 0.3440   | 1.55 | 56.1 | −5.74 | 4.8926 |
| S2  | Aspheric  | 8.6006   | 0.6857   |      |      |       | −21.3749 |
| S3  | Spherical | Infinite | 1.4300   | 1.52 | 64.2 |       |        |
| S4  | Spherical | Infinite | −1.4300  | 1.52 | 64.2 |       |        |
| S5  | Spherical | Infinite | −0.2713  |      |      |       |        |
| STO | Spherical | Infinite | −0.1387  |      |      |       |        |
| S6  | Aspheric  | 2.5576   | 1.3525   | 1.55 | 56.1 | 2.42  | 1.8302 |
| S7  | Aspheric  | −2.2256  | 0.0827   |      |      |       | 0.5616 |
| S8  | Aspheric  | −35.3106 | 0.2500   | 1.67 | 20.4 | −5.37 | 37.2074 |
| S9  | Aspheric  | 3.9961   | 0.0312   |      |      |       | −6.6162 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S10 | Aspheric | 9.7736 | 0.2674 | 1.55 | 56.1 | 9.23 | −62.1317 |
| S11 | Aspheric | −10.3062 | 0.0440 | | | | 27.5886 |
| S12 | Spherical | Infinite | −1.6000 | 1.52 | 64.2 | | |
| S13 | Spherical | Infinite | 1.6000 | 1.52 | 64.2 | | |
| S14 | Spherical | Infinite | 0.6088 | | | | |
| S15 | Aspheric | −1.1559 | 0.2500 | 1.67 | 20.4 | −6.38 | −5.0129 |
| S16 | Aspheric | −1.7240 | 0.0199 | | | | −21.8298 |
| S17 | Spherical | Infinite | 0.1100 | 1.52 | 64.2 | | |
| S18 | Spherical | Infinite | 0.2500 | | | | |
| S19 | Spherical | Infinite | | | | | |

TABLE 8

| Surface number | A4 | A6 | A8 | A10 | A12 |
|---|---|---|---|---|---|
| S1 | 1.5856E−01 | −1.0765E−01 | 8.3060E−02 | −6.5949E−02 | 4.6922E−02 |
| S2 | 1.7983E−01 | −1.2141E−01 | 1.8284E−01 | −3.1729E−01 | 4.1703E−01 |
| S6 | 3.3858E−02 | −2.7206E−01 | 3.7416E+00 | −2.8691E+01 | 1.4186E+02 |
| S7 | −3.6790E−02 | 4.0636E−01 | −1.7553E+00 | 3.8311E+00 | 4.7977E+00 |
| S8 | 5.9223E−02 | 6.7131E−01 | −4.6746E+00 | 1.8404E+01 | −4.3169E+01 |
| S9 | −1.6862E−01 | 3.3096E+00 | −2.1142E+01 | 8.1335E+01 | −2.0494E+02 |
| S10 | −3.7167E−01 | 3.5813E+00 | −2.0050E+01 | 6.8196E+01 | −1.4286E+02 |
| S11 | −1.0820E−01 | 1.0041E−01 | 2.9842E−01 | −4.8823E+00 | 2.7423E+01 |
| S15 | −2.2396E−01 | 1.1987E+00 | −2.8637E+00 | 4.0263E+00 | −3.6443E+00 |
| S16 | −3.6182E−01 | 1.6718E+00 | −3.3634E+00 | 4.1574E+00 | −3.4874E+00 |

| Surface number | A14 | A16 | A18 | A20 |
|---|---|---|---|---|
| S1 | −2.6141E−02 | 1.0526E−02 | −2.9088E−03 | 5.2066E−04 |
| S2 | −3.7377E−01 | 2.2482E−01 | −8.9401E−02 | 2.2541E−02 |
| S6 | −4.7078E+02 | 1.0716E+03 | −1.6780E+03 | 1.7777E+03 |
| S7 | −5.2717E+01 | 1.5109E+02 | −2.4171E+02 | 2.3860E+02 |
| S8 | 6.1929E+01 | −5.1805E+01 | 1.8934E+01 | 4.7229E+00 |
| S9 | 3.5044E+02 | −4.1047E+02 | 3.2440E+02 | −1.6519E+02 |
| S10 | 1.6926E+02 | −5.6476E+01 | −1.4598E+02 | 2.5471E+02 |
| S11 | −9.1418E+01 | 1.9744E+02 | −2.8322E+02 | 2.6848E+02 |
| S15 | 2.1481E+00 | −7.7876E−01 | 1.3212E−01 | 1.4709E−02 |
| S16 | 2.0639E+00 | −8.7347E−01 | 2.6330E−01 | −5.5278E−02 |

FIG. 8A illustrates the astigmatic curves of the camera lens group according to example 4, representing the curvatures of a tangential plane and the curvatures of a sagittal plane. FIG. 8B illustrates a distortion curve of the camera lens group according to example 4, representing the amounts of distortion corresponding to different image heights. FIG. 8C illustrates a relative illumination curve of the camera lens group according to example 4, representing the amounts of relative illuminations corresponding to different image heights. It can be seen from FIG. 8A to FIG. 8C that the camera lens group provided in example 4 may achieve good image quality.

EXAMPLE 5

Figure 9:
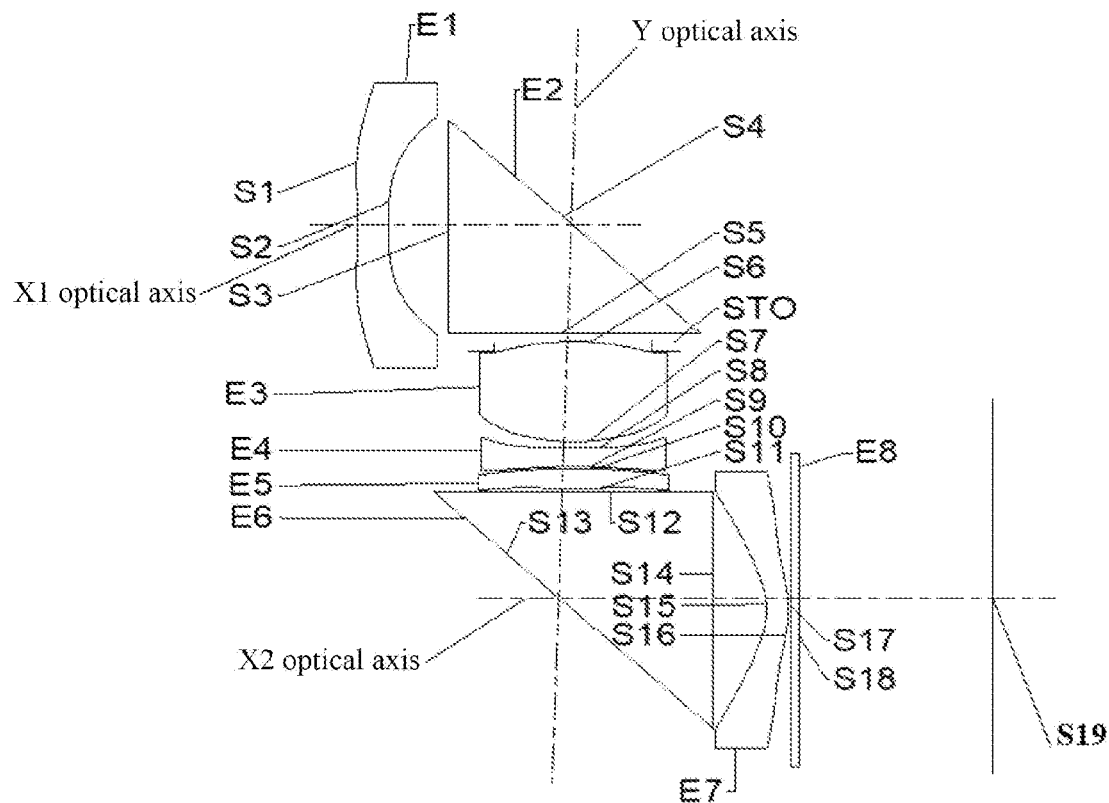
FIG. 9 illustrates a schematic structural view of a camera lens group according to example 5 of the present disclosure.

A camera lens group according to example 5 of the present disclosure is described below with reference to FIG. 9 to FIG. 10C. FIG. 9 shows a schematic structural view of the camera lens group according to example 5 of the present disclosure.

As shown in FIG. 9, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E1 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is concave, and an image-side surface S9 thereof is concave. The fourth lens E5 has positive refractive power, an object-side surface S10 thereof is concave, and an image-side surface S11 thereof is convex. The second prism E6 has a light incident surface S12, a second reflecting surface S13, and a light exit surface S14. The fifth lens E7 has negative refractive power, an object-side surface S15 thereof is concave, and an image-side surface S16 thereof is convex. The optical filter E8 has an object-side surface S17 and an image-side surface S18. Light from an object sequentially passes through the respective surfaces S1 to S18 and is finally imaged on the imaging plane S19.

In this example, half of a diagonal length ImgH of an effective pixel area on the imaging plane S19 of the camera lens group is 2.30 mm, half of a maximum field-of-view Semi-FOV of the camera lens group is 40.0°, an aperture value Fno of the camera lens group is 2.30, and a total effective focal length f of the camera lens group is 3.13 mm.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

Figures 10A, 10B:
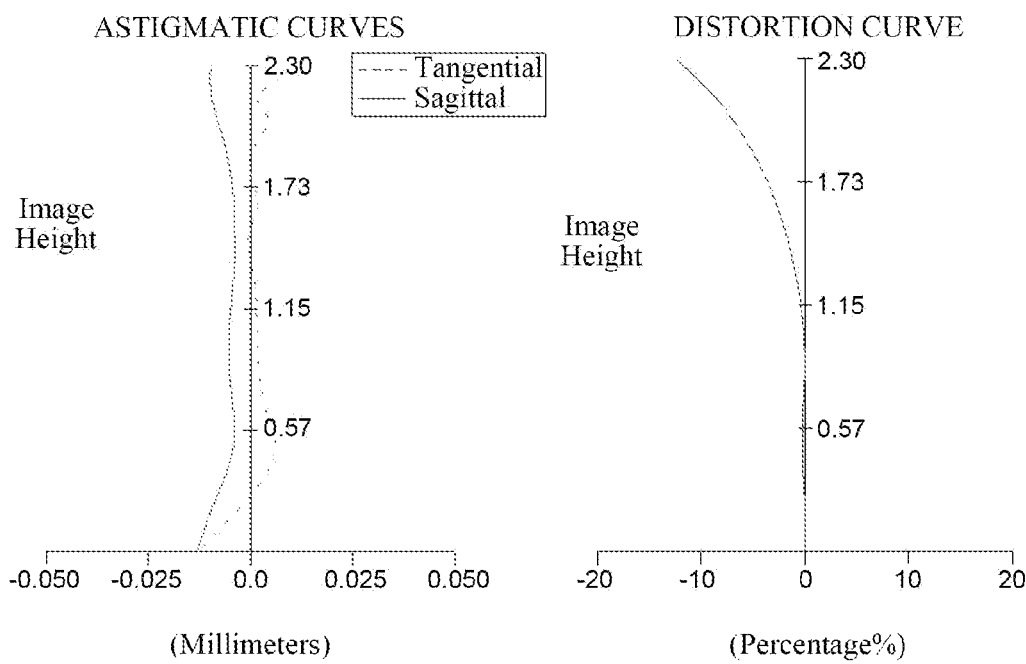
FIGS. 10A to 10C illustrate astigmatic curves, a distortion curve and a relative illumination curve of the camera lens group of the example 5, respectively.
Figure 10C:
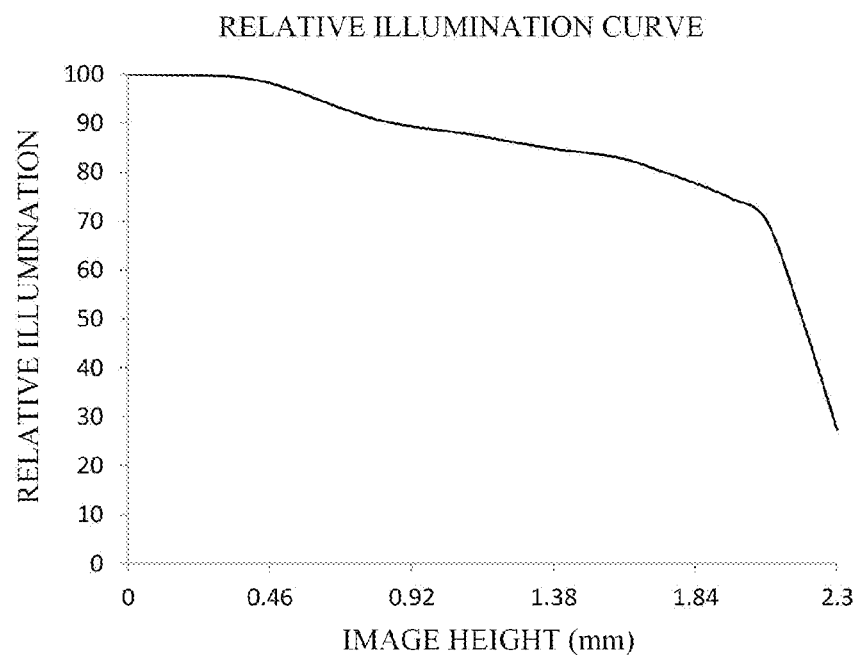

FIG. 10A illustrates the astigmatic curves of the camera lens group according to example 5, representing the curvatures of a tangential plane and the curvatures of a sagittal plane. FIG. 10B illustrates a distortion curve of the camera lens group according to example 5, representing the amounts of distortion corresponding to different image heights. FIG. 10C illustrates a relative illumination curve of the camera lens group according to example 5, representing the amounts of relative illuminations corresponding to different image

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.0308 | 0.2856 | 1.55 | 56.1 | −6.72 | 4.8523 |
| S2 | Aspheric | 13.7844 | 0.5800 | | | | −53.8346 |
| S3 | Spherical | Infinite | 1.4300 | 1.52 | 64.2 | | |
| S4 | Spherical | Infinite | −1.4300 | 1.52 | 64.2 | | |
| S5 | Spherical | Infinite | −0.2713 | | | | |
| STO | Spherical | Infinite | −0.1610 | | | | |
| S6 | Aspheric | 2.6596 | 1.6135 | 1.55 | 56.1 | 2.49 | 2.2161 |
| S7 | Aspheric | −2.1843 | 0.0518 | | | | 0.3279 |
| S8 | Aspheric | −14.5491 | 0.2300 | 1.67 | 20.4 | −6.25 | −43.5280 |
| S9 | Aspheric | 5.8844 | 0.0267 | | | | −5.9658 |
| S10 | Aspheric | −300.0000 | 0.2669 | 1.55 | 56.1 | 11.43 | −99.0000 |
| S11 | Aspheric | −6.1166 | 0.0200 | | | | 21.7867 |
| S12 | Spherical | Infinite | −1.6000 | 1.52 | 64.2 | | |
| S13 | Spherical | Infinite | 1.6000 | 1.52 | 64.2 | | |
| S14 | Spherical | Infinite | 0.5773 | | | | |
| S15 | Aspheric | −1.4971 | 0.2300 | 1.67 | 20.4 | −4.90 | −8.5782 |
| S16 | Aspheric | −2.9320 | 0.1000 | | | | −99.0000 |
| S17 | Spherical | Infinite | 0.1100 | 1.52 | 64.2 | | |
| S18 | Spherical | Infinite | 0.1800 | | | | |
| S19 | Spherical | Infinite | | | | | |

TABLE 10

| Surface number | A4 | A6 | A8 | A10 | A12 |
|---|---|---|---|---|---|
| S1 | 1.5728E−01 | −8.4645E−02 | 2.3438E−02 | 2.5011E−02 | −4.1964E−02 |
| S2 | 1.7118E−01 | −9.0216E−02 | 8.2330E−02 | −1.3775E−01 | 2.3471E−01 |
| S6 | 3.1723E−02 | −1.9038E−01 | 2.2582E+00 | −1.4967E+01 | 6.4335E+01 |
| S7 | −1.3390E−02 | 1.6043E−01 | −7.9758E−01 | 3.6487E+00 | −9.5590E+00 |
| S8 | 9.8414E−02 | 1.7302E−01 | −1.4778E+00 | 5.2903E+00 | −8.0704E+00 |
| S9 | −1.2756E−01 | 1.8544E+00 | −7.5371E+00 | 1.3796E+01 | 3.8591E−01 |
| S10 | −3.4405E−01 | 2.1952E+00 | −6.5263E+00 | 3.0416E+00 | 4.2146E+01 |
| S11 | −1.1680E−01 | 2.0339E−01 | −6.2515E−01 | 1.9906E+00 | −5.6305E+00 |
| S15 | −2.6770E−01 | 1.4637E+00 | −3.7256E+00 | 5.4934E+00 | −5.1876E+00 |
| S16 | −4.0283E−01 | 2.0015E+00 | −4.2153E+00 | 5.3079E+00 | −4.4459E+00 |

| Surface number | A14 | A16 | A18 | A20 |
|---|---|---|---|---|
| S1 | 3.1576E−02 | −1.4645E−02 | 4.3753E−03 | −8.2065E−04 |
| S2 | −2.8362E−01 | 2.2936E−01 | −1.2185E−01 | 4.0778E−02 |
| S6 | −1.8633E+02 | 3.7107E+02 | −5.0917E+02 | 4.7301E+02 |
| S7 | 1.5255E+01 | −1.5764E+01 | 1.0846E+01 | −5.0031E+00 |
| S8 | 1.2631E+00 | 1.4332E+01 | −2.3629E+01 | 1.7999E+01 |
| S9 | −5.3528E+01 | 1.1391E+02 | −1.2114E+02 | 7.2768E+01 |
| S10 | −1.5336E+02 | 2.7477E+02 | −2.9918E+02 | 2.0665E+02 |
| S11 | 1.1903E+01 | −1.8295E+01 | 2.0152E+01 | −1.5263E+01 |
| S15 | 3.2196E+00 | −1.2769E+00 | 2.8303E−01 | −1.2338E−02 |
| S16 | 2.5872E+00 | −1.0628E+00 | 3.0742E−01 | −6.1276E−02 |

EXAMPLE 6

Figure 11:
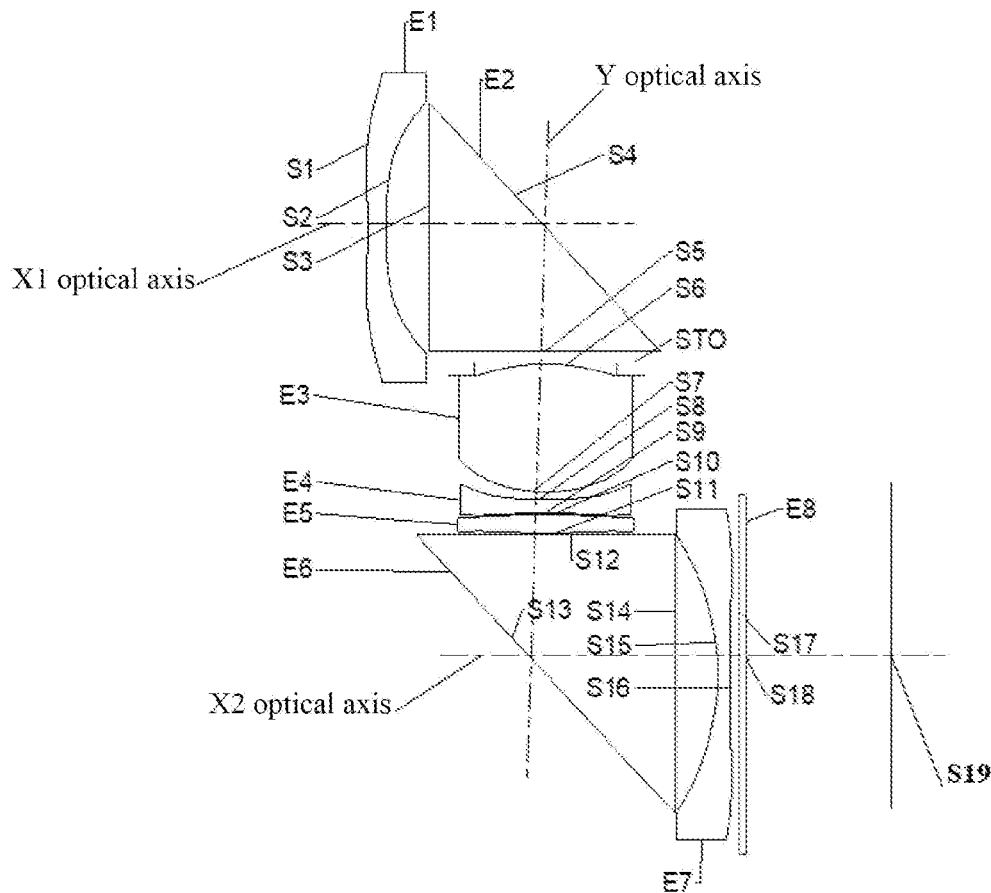
FIG. 11 illustrates a schematic structural view of a camera lens group according to example 6 of the present disclosure.

A camera lens group according to example 6 of the present disclosure is described below with reference to FIG. 11 to FIG. 12C. FIG. 11 shows a schematic structural view of the camera lens group according to example 6 of the present disclosure.

As shown in FIG. 11, the camera lens group, sequentially from an object side to an image side, includes: a first lens E1 and a first prism E2 arranged along an X1 optical axis; a stop STO, a second lens E3, a third lens E4, a fourth lens E5 and a second prism E6 arranged along a Y optical axis; and a fifth lens E7, an optical filter E8 and an imaging plane S19 arranged along an X2 optical axis.

The first lens E1 has negative refractive power, an object-side surface S1 thereof is concave, and an image-side surface S2 thereof is concave. The first prism E2 has a light incident surface S3, a first reflecting surface S4, and a light exit surface S5. The second lens E3 has positive refractive power, an object-side surface S6 thereof is convex, and an image-side surface S7 thereof is convex. The third lens E4 has negative refractive power, an object-side surface S8 thereof is concave, and an image-side surface S9 thereof is concave. The fourth lens E5 has positive refractive power, an object-side surface S10 thereof is convex, and an image-side surface S11 thereof is convex. The second prism E6 has a light incident surface S12, a second reflecting surface S13, and a light exit surface S14. The fifth lens E7 has negative refractive power, an object-side surface S15 thereof is concave, and an image-side surface S16 thereof is concave. The optical filter E8 has an object-side surface S17 and an image-side surface S18. Light from an object sequentially passes through the respective surfaces S1 to S18 and is finally imaged on the imaging plane S19.

In this example, half of a diagonal length ImgH of an effective pixel area on the imaging plane S19 of the camera lens group is 2.93 mm, half of a maximum field-of-view Semi-FOV of the camera lens group is 41.0°, an aperture value Fno of the camera lens group is 2.50, and a total effective focal length f of the camera lens group is 4.02 mm.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −6.4109 | 0.3044 | 1.55 | 56.1 | −8.64 | 4.8542 |
| S2 | Aspheric | 18.1356 | 0.7158 | | | | −68.9001 |
| S3 | Spherical | Infinite | 1.9154 | 1.52 | 64.2 | | |
| S4 | Spherical | Infinite | −1.9154 | 1.52 | 64.2 | | |
| S5 | Spherical | Infinite | −0.3461 | | | | |
| STO | Spherical | Infinite | −0.1796 | | | | |
| S6 | Aspheric | 3.3895 | 1.9620 | 1.55 | 56.1 | 3.16 | 2.0300 |
| S7 | Aspheric | −2.7923 | 0.1087 | | | | 0.3409 |
| S8 | Aspheric | −18.8837 | 0.2100 | 1.67 | 20.4 | −7.21 | −46.7133 |
| S9 | Aspheric | 6.4813 | 0.0304 | | | | −8.2068 |
| S10 | Aspheric | 56.2563 | 0.2810 | 1.55 | 56.1 | 12.93 | −99.0000 |
| S11 | Aspheric | −8.0556 | 0.0200 | | | | 21.8531 |
| S12 | Spherical | Infinite | −2.1431 | 1.52 | 64.2 | | |
| S13 | Spherical | Infinite | 2.1431 | 1.52 | 64.2 | | |
| S14 | Spherical | Infinite | 0.7011 | | | | |
| S15 | Aspheric | −3.0769 | 0.2100 | 1.67 | 20.4 | −4.15 | −6.9607 |
| S16 | Aspheric | 28.1393 | 0.1432 | | | | 99.0000 |
| S17 | Spherical | Infinite | 0.1100 | 1.52 | 64.2 | | |
| S18 | Spherical | Infinite | 0.2452 | | | | |
| S19 | Spherical | Infinite | | | | | |

TABLE 12

| Surface number | A4 | A6 | A8 | A10 | A12 |
|---|---|---|---|---|---|
| S1 | 7.2373E−02 | −1.8284E−02 | −3.2861E−03 | 7.9149E−03 | −5.1531E−03 |
| S2 | 7.6664E−02 | −1.4253E−02 | −3.7617E−03 | 3.8188E−03 | 1.4132E−03 |
| S6 | 1.3861E−02 | −3.0411E−02 | 2.8579E−01 | −1.4069E+00 | 4.4988E+00 |
| S7 | −1.4878E−02 | 6.2765E−02 | −1.1533E−01 | 2.1358E−01 | −1.7769E−01 |
| S8 | 3.6592E−02 | 1.4535E−01 | −7.0226E−01 | 1.8273E+00 | −2.7834E+00 |
| S9 | −8.7026E−02 | 8.5208E−01 | −2.7617E+00 | 4.8859E+00 | −4.6922E+00 |
| S10 | −1.9912E−01 | 9.8555E−01 | −2.6109E+00 | 3.5173E+00 | −1.0963E+00 |
| S11 | −6.2824E−02 | 1.0987E−01 | −3.0513E−01 | 7.0938E−01 | −1.1807E+00 |
| S15 | −1.0198E−01 | 3.0818E−01 | −4.1677E−01 | 3.0778E−01 | −1.2913E−01 |
| S16 | −1.664 IE−01 | 3.9486E−01 | −4.4672E−01 | 3.0427E−01 | −1.3685E−01 |

TABLE 12-continued

| Surface number | A14 | A16 | A18 | A20 |
|---|---|---|---|---|
| S1 | 2.0073E−03 | −5.1371E−04 | 8.7029E−05 | −9.4056E−06 |
| S2 | −3.3741E−03 | 2.1895E−03 | −7.7319E−04 | 1.5975E−04 |
| S6 | −9.6771E+00 | 1.4286E+01 | −1.4502E+01 | 9.9482E+00 |
| S7 | −1.1994E−01 | 4.4000E−01 | −4.7984E−01 | 2.8812E−01 |
| S8 | 2.6670E+00 | −1.6608E+00 | 6.7123E−01 | −1.7033E−01 |
| S9 | 1.8080E+00 | 8.5373E−01 | −1.3585E+00 | 6.7872E−01 |
| S10 | −3.8359E+00 | 6.7567E+00 | −5.5740E+00 | 2.7123E+00 |
| S11 | 1.3059E+00 | −9.3701E−01 | 4.1596E−01 | −9.7730E−02 |
| S15 | 2.3610E−02 | 4.5807E−03 | −4.0508E−03 | 1.1549E−03 |
| S16 | 4.2247E−02 | −9.0566E−03 | 1.3366E−03 | −1.3165E−04 |

FIG. 12A illustrates the astigmatic curves of the camera lens group according to example 6, representing the curvatures of a tangential plane and the curvatures of a sagittal plane. FIG. 12B illustrates a distortion curve of the camera lens group according to example 6, representing the amounts of distortion corresponding to different image heights. FIG. 12C illustrates a relative illumination curve of the camera lens group according to example 6, representing the amounts of relative illuminations corresponding to different image heights. It can be seen from FIG. 12A to FIG. 12C that the camera lens group provided in example 6 may achieve good image quality.

In view of the above, examples 1 to 6 respectively satisfy the relationship shown in Table 13.

TABLE 13

| Condition | Example | | | | | |
| | 1 | 2 | 3 | 4 | 5 | 6 |
|---|---|---|---|---|---|---|
| ImgH/tan²(Semi-FOV) (mm) | 2.64 | 2.55 | 2.79 | 2.74 | 3.27 | 3.88 |
| f4/f2 | 2.69 | 2.92 | 3.26 | 3.81 | 4.59 | 4.09 |
| f34/BFL | 37.81 | 30.39 | 35.94 | 34.93 | 37.11 | 34.01 |
| (R1 + R4)/(R1 − R4) | 2.66 | 2.80 | 2.78 | 2.60 | 2.53 | 2.54 |
| R6/R3 | 0.73 | 0.87 | 0.99 | 1.56 | 2.21 | 1.91 |
| R2/f | 1.71 | 2.16 | 2.27 | 2.86 | 4.41 | 4.51 |
| (f23 + f234)/(f23 − f234) | 5.85 | 6.07 | 6.86 | 8.47 | 10.95 | 9.13 |
| CT2/CT3 | 4.71 | 4.87 | 5.00 | 5.41 | 7.02 | 9.34 |
| SAG12/SAG11 | 3.49 | 3.52 | 3.77 | 3.10 | 2.54 | 2.65 |
| (DT11 + DT12)/(DT11 − DT12) | 6.12 | 6.87 | 7.30 | 7.60 | 9.07 | 9.52 |
| FOV (°) | 86.0 | 87.0 | 84.5 | 85.0 | 80.0 | 82.0 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
    a first lens having refractive power;
    a first prism having a first reflecting surface, and an angle between the first reflecting surface and the optical axis being 45°;
    a stop;
    a second lens having refractive power;
    a third lens having refractive power;
    a fourth lens having refractive power;
    a second prism having a second reflecting surface, and an angle between the second reflecting surface and the optical axis being 45°; and
    a fifth lens having refractive power,
    wherein FOV≥80.0°,
    where FOV is a maximum field-of-view of the camera lens group, and
    wherein a total number of lenses in the camera lens group is a five and a total number of prisms in the camera lens group is two.

2. The camera lens group according to claim 1, wherein 2.00 mm<ImgH/tan²(Semi-FOV)<4.00 mm,
    where Semi-FOV is half of a maximum field-of-view of the camera lens group, and ImgH is half of a diagonal length of an effective pixel area on an imaging plane of the camera lens group.

3. The camera lens group according to claim 1, wherein 2.00<f4/f2<5.00,
    where f2 is an effective focal length of the second lens, and f4 is an effective focal length of the fourth lens.

4. The camera lens group according to claim 1, wherein 30.00<f34/BFL<40.00,
    where f34 is a combined focal length of the third lens and the fourth lens, and BFL is a distance from the fifth lens to an imaging plane of the camera lens group along the optical axis.

5. The camera lens group according to claim 1, wherein 2.00<(R1+R4)/(R1−R4)<3.00,
    where R1 is a radius of curvature of an object-side surface of the first lens, and R4 is a radius of curvature of an image-side surface of the second lens.

6. The camera lens group according to claim 1, wherein 0.50<R6/R3<2.50,
    where R3 is a radius of curvature of an object-side surface of the second lens, and R6 is a radius of curvature of an image-side surface of the third lens.

7. The camera lens group according to claim 1, wherein 1.00<R2/f<5.00, where R2 is a radius of curvature of an image-side surface of the first lens, and f is a total effective focal length of the camera lens group.

8. The camera lens group according to claim 1, wherein $5.00<(f23+f234)/(f23-f234)<11.00$,
where f23 is a combined focal length of the second lens and the third lens, and f234 is a combined focal length of the second lens, the third lens and the fourth lens.

9. The camera lens group according to claim 1, wherein $4.00<CT2/CT3<10.00$,
where CT2 is a center thickness of the second lens along the optical axis, and CT3 is a center thickness of the third lens along the optical axis.

10. The camera lens group according to claim 1, wherein $2.00<SAG12/SAG11<4.00$,
where SAG11 is a distance along the optical axis from an intersection of an object-side surface of the first lens and the optical axis to a vertex of an effective radius of the object-side surface of the first lens, and SAG12 is a distance along the optical axis from an intersection of an image-side surface of the first lens and the optical axis to a vertex of an effective radius of the image-side surface of the first lens.

11. The camera lens group according to claim 1, wherein $6.00<(DT11+DT12)/(DT11-DT1)<10.00$,
where DT11 is a maximum effective radius of an object-side surface of the first lens, and DT12 is a maximum effective radius of an image-side surface of the first lens.

12. A camera lens group, sequentially from an object side to an image side of the camera lens group along an optical axis, comprising:
a first lens having refractive power;
a first prism having a first reflecting surface, and an angle between the first reflecting surface and the optical axis being 45°;
a stop;
a second lens having refractive power;
a third lens having refractive power;
a fourth lens having refractive power;
a second prism having a second reflecting surface, and an angle between the second reflecting surface and the optical axis being 45°; and
a fifth lens having refractive power,
wherein $2.00 \text{ mm} < \text{ImgH}/\tan^2(\text{Semi-FOV}) < 4.00 \text{ mm}$,
where Semi-FOV is half of a maximum field-of-view of the camera lens group, and ImgH is half of a diagonal length of an effective pixel area on an imaging plane of the camera lens group; and wherein a total number of lenses in the camera lens group is five and a total number of prisms in the camera lens group is two.

13. The camera lens group according to claim 12, wherein $2.00<f4/f2<5.00$,
where f2 is an effective focal length of the second lens, and f4 is an effective focal length of the fourth lens.

14. The camera lens group according to claim 12, wherein $30.00<f34/BFL<40.00$,
where f34 is a combined focal length of the third lens and the fourth lens, and BFL is a distance from the fifth lens to the imaging plane of the camera lens group along the optical axis.

15. The camera lens group according to claim 12, wherein $2.00<(R1+R4)/(R1-R4)<3.00$,
where R1 is a radius of curvature of an object-side surface of the first lens, and R4 is a radius of curvature of an image-side surface of the second lens.

16. The camera lens group according to claim 12, wherein $0.50<R6/R3<2.50$,
where R3 is a radius of curvature of an object-side surface of the second lens, and R6 is a radius of curvature of an image-side surface of the third lens.

17. The camera lens group according to claim 12, wherein $1.00<R2/f<5.00$,
where R2 is a radius of curvature of an image-side surface of the first lens, and f is a total effective focal length of the camera lens group.

18. The camera lens group according to claim 12, wherein $5.00<(f23+f234)/(f23-f234)<11.00$,
where f23 is a combined focal length of the second lens and the third lens, and f234 is a combined focal length of the second lens, the third lens and the fourth lens.

19. The camera lens group according to claim 12, wherein $4.00<CT2/CT3<10.00$,
where CT2 is a center thickness of the second lens along the optical axis, and CT3 is a center thickness of the third lens along the optical axis.

20. The camera lens group according to claim 12, wherein $2.00<SAG12/SAG11<4.00$,
where SAG11 is a distance along the optical axis from an intersection of an object-side surface of the first lens and the optical axis to a vertex of an effective radius of the object-side surface of the first lens, and SAG12 is a distance along the optical axis from an intersection of an image-side surface of the first lens and the optical axis to a vertex of an effective radius of the image-side surface of the first lens.

* * * * *